Aug. 30, 1966    J. P. CREWS ETAL    3,269,113
ROCKET MOTOR HAVING SOLID FUEL INSULATING MEANS
Filed Dec. 18, 1962
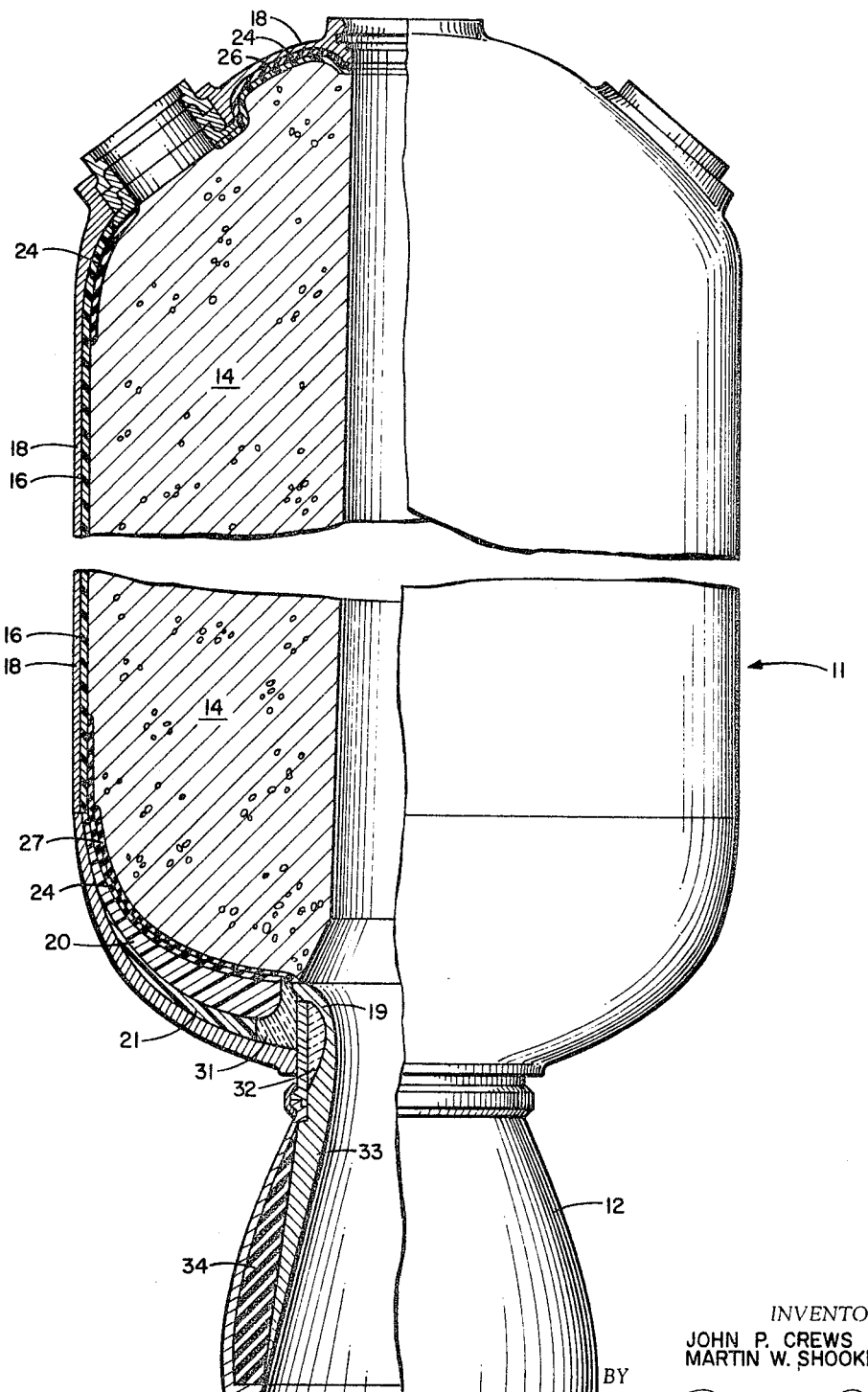
INVENTORS
JOHN P. CREWS
MARTIN W. SHOOKHOFF
BY
ATTORNEY

United States Patent Office 3,269,113
Patented August 30, 1966

3,269,113
ROCKET MOTOR HAVING SOLID FUEL INSULATING MEANS
John P. Crews and Martin W. Shookhoff, Sacramento, Calif., assignors to Aerojet-General Corporation, Azusa, Calif., a corporation of Ohio
Filed Dec. 18, 1962, Ser. No. 247,439
5 Claims. (Cl. 60—35.6)

This invention relates in general to insulation and in particular to a method of bonding a filler within a container.

It has long been desired in rocket propulsion systems to so insulate the propellant within the rocket chamber that maximum heat reduction is obtained without a necessity for additional insulation and/or cooling systems, and also to so encase the propellant that differential expansion is allowed while precluding a breathing action in the chamber which, if permitted, would result in an increased burning area during motor ignition. Such an increased burning area can cause excessive motor pressure and a subsequent explosion.

The present invention provides a method of insulating the propellant as well as confining the propellant in a chamber which results in maximum heat reduction as well as a reduction in weight and cost over prior practices. The propellant insulation devised is readily adapted to various contours without fitting problems, and as otherwise explained herein avoids the disadvantages of prior propellant insulations.

Accordingly, it is an object of the present invention to provide a lightweight insulation for propulsion systems.

It is another object of this invention to provide a propellant insulation which precludes the occurrence of breathing action between the propellent and insulation thereby preventing an increased burning area during motor ignition.

It is a still further object of the present invention to provide a propellant insulation which affords maximum heat reduction thereby eliminating any necessity for additional insulation and/or cooling systems.

Other objects and many of the attendant advantages of this invention will be readily appreciated as the same becomes better understood by reference to the following detailed description when considered in connection with the accompanying drawing wherein chamber 11 has attached to it nozzle 12 and contains propellant or other comparable filler 14. The propellant considered in the embodiment of the invention discussed herein is one which is cured within the chamber such that prior to curing or introducing the propellant the chamber is prepared by first lining the interior thereof with a fiberglass or other liner 16 of comparable material which is bonded to the chamber wall 18 by suitable adhesive. The liner 16 may cover the entire inner surface of the chamber 11 to the throat portion 19 thereof or, as in the embodiment shown, may extend from the forward end toward the throat and be continued by a filler 20 whose function is to provide a backing to form the propellant or filler to a shape which insures against extending its longitudinal dimension as it progresses from the throat to the opposite or forward end of the chamber. Where necessary, backing 20 may be further supported away from the chamber wall 18 by a second backing 21 which may be of foam rubber or a similar resilient material.

In the areas where separation between propellant and the material bonded to it is most likely to occur, that is, in the region of the throat and in the forward region of the chamber, a preformed insulation layer 24 is bonded to the liner and in turn has bonded to it a forward boot 26 and an aft boot 27. Insulation 24 is included to afford maximum heat reduction and to eliminate any necessity for additional insulation and/or cooling. Insulation 24 can be preformed to any desired shape, and is made or composed of material which is readily adapted to various contours without fitting problems, such as neoprene or nitrile rubber. Additives, such as quartz, fibers, Refrasil glass, fiberglass, nylon fibers, magnesium carbonate and asbestos may be impregnated into the material to increase erosion resistance. To improve bonding characteristics, the insulation may have impregnated to either of its surfaces fiberglass scrim cloth. The insulation is bonded to metal parts by use of suitable adhesives. In the embodiment shown insulation 24 is bonded to liner 16 which in turn is bonded to the chamber wall 18 which may be either metal or fiberglass or other comparable substance. The aft insulation 24 is, in the embodiment shown, bonded to the backing material 20 to provide a desired contour whose primary function is to enhance progressive burning without breathing action. The boot 27 may be constructed of material such as neoprene or nitrile rubber, and also may have scrim cloth bonded to the propellant or filler side as well as to the side to be bonded to either the chamber liner 16 or insulation 24.

The forward insulation is of molded construction and formed of material such as neoprene or nitrile rubber having, if desired, suitable bonded facing material such as fiberglass scrim cloth, not shown. Suitable adhesives are used to bond the forward boot to the propellant or filler and to the forward insulations.

The aft insulation is also of molded neoprene or nitrile rubber having, if desired, scrim cloth bonded to the chamber side and using suitable adhesives to bond the insulation to the chamber. The aft boot is constructed of material such as neoprene or nitrile rubber also having the scrim cloth bonded to the propellant side and to the side which is to be bonded to the chamber liner and insulation, if desired. The aft closure insulation is of a suitable flexible molded material such as peoprene rubber having scrim cloth applied to areas which require bonding. Suitable adhesives are used to bond the insulation to the aft closure and the propellant. Both the forward and aft insulation may have wire impregnated thereinto to act as a heat sink, such wire being composed of materials such as brass, and molybdenum.

The backing 20 and 21 may be of such material as an epoxy cement may be used as a potting compound between the respective nozzles and a back-up structure to be potted in irregular areas such as around the bolt heads, etc.

The throat is formed by inserting preformed graphite rings 31 and 32 and installing thereon nozzle liner 33 which is of a high heat resistant alloy such as tungsten-molybdenum, tungsten-tantalum, tungsten-columbium, or similar alloys. Filler 34 is of phenolic Refrasil material, or plastic, and may be added to provide the desired nozzle shape.

The use of graphite in the throat acts as a heat sink to carry heat away from that area thereby eliminating failures due to cracking and splitting of the throat that might result in the case where no heat sink is provided. A high heat resistant alloy is installed over the graphite to further avoidance of such cracking and splitting and to permit higher motor operating temperatures and, therefore, greater efficiency.

Propellant combinations are cast into the aft closure assembly after completion of the installation of linings, backing and insulation, and the main propellant grain is cast in the chamber to provide a center core for facilitating internal grain burning. Thrust reversal ports, not shown, are covered with a flexible material such as neoprene rubber, which is bonded by a suitable adhesive to the propellant grain.

There is thus provided here a method of lining and insulating the chamber of a solid propellant rocket engine which permits the optimum of progressive ablation. Erosion problems are minimized, and by capping the propellant in the aft closure it is possible to minimize the use of inert insulation. By elimination of sealing joints, a positive insulation of metal parts is permitted. The use of flexible insulation as described in the foregoing specification permits ease of application thereof for various contours of chamber components. The type of insulation described permits the use of materials which have a very low thermal conductivity.

The insulation and boots are of minimum weight, may be obtained and installed in a minimum fabrication time at a minimum cost, are capable of being used interchangeably in rocket engines with widely varying fabrication tolerances, have a high degree of bondability, and provide a positive seal to prevent leakage of propellant through the insulation when it is cast. Through use of the method of lining a chamber disclosed in the foregoing, the propellant is encased in its forward and aft ends in a boot which is free to move in and out and thereby prevents gas from flowing between the boots and the propellant. Such action allows for differential expansion of the propellant and prevents a breathing action from occurring and accumulating. The boot and insulation likewise prevent an increased burning area from occurring during motor ignition.

Obviously, many modifications and variations of the present invention are possible in the light of the above teachings. It is, therefore, to be understood that within the scope of the appended claims the invention may be practiced otherwise and as specifically described.

We claim:

1. Means for insulating solid propellant grain in a rocket engine chamber having forward intermediate and aft portions to provide maximum heat reduction and avoid increased burning area during motor ignition comprising lining means lining the intermediate portion of the chamber, said lining means being bonded to the chamber and to the propellant, first flexible insulation means bonded to the chamber in the forward portion thereof, first boot means bonded to the first insulation means, second flexible insulation means bonded to the aft portion of the chamber, and second boot means bonded to the second insulation means, each of said boot means also being bonded to said propellant whereby differential expansion of the propellant is permitted and gas is prevented from flowing between the boot means and the propellant.

2. The means claimed in claim 1 and heat transfer means supporting the aft portion of the engine chamber including a throat surface whereby increased operating temperatures may be attained.

3. The means claimed in claim 2 wherein said heat transfer means is graphite and the throat surface is of a high heat resistant alloy.

4. Means for insulating solid propellant grain in a rocket engine chamber having forward, intermediate and aft portions to provide maximum heat reduction and avoid increased burning area during motor ignition comprising fiberglass means lining the wall of said chamber intermediate the aft and forward portions thereof, said fiberglass means being bonded to the wall of said chamber, neoprene insulation means lining and bonded to the aft and forward portions of the wall of said chamber, and nitrile rubber boot means bonded to said neoprene insulation means, said propellant being bonded to said fiberglass means and said boot means whereby said insulation means provides maximum heat reduction in said chamber and said boot means prevents gas from flowing between the boot means and the propellant during motor ignition.

5. The means claimed in claim 4 and further comprising graphite means supporting a portion of the aft portion that includes a throat surface of said chamber to permit increased operating temperatures.

References Cited by the Examiner

UNITED STATES PATENTS

| | | | |
|---|---|---|---|
| 2,816,418 | 12/1957 | Loedding | 60—35.6 |
| 2,820,410 | 1/1958 | Tarr | 60—35.6 X |
| 2,978,377 | 4/1961 | Hall et al. | 60—35.6 X |
| 2,987,880 | 6/1961 | Kimmel | 60—35.6 |
| 2,995,011 | 8/1961 | Kimmel | 60—35.6 |
| 3,001,498 | 9/1961 | Karp | 60—35.6 X |
| 3,122,884 | 3/1964 | Grover et al. | 60—35.6 |
| 3,156,091 | 11/1964 | Kraus | 60—35.6 |
| 3,157,026 | 11/1964 | Lampert | 60—35.6 |

MARK NEWMAN, *Primary Examiner.*

CARLTON R. CROYLE, *Examiner.*